United States Patent Office 3,043,888
Patented July 10, 1962

---

3,043,888
STABILIZATION
Blaine O. Pray and Donald E. Hardies, Wadsworth, Ohio, assignors, by mesne assignments, to Pittsburgh Plate Glass Company
No Drawing. Filed Feb. 9, 1959, Ser. No. 791,803
8 Claims. (Cl. 260—652.5)

The present invention deals with the stabilization of halogenated hydrocarbons. It concerns more particularly stabilization of degreasing solvents, notably trichloroethylene, against decomposition during the degreasing of metals.

Among the more widely used industrial solvents are the halogenated hydrocarbons, principally the normally liquid chlorinated hydrocarbons of 1 to 3 carbons exemplified by trichloroethylene and perchloroethylene. One major solvent use is for degreasing of metals. Metal degreasing is usually accomplished by placing the articles requiring cleaning (degreasing) in appropriate apparatus (a degreaser) above the liquid level of a boiling body of trichloroethylene. Trichloroethylene vapors surround and condense on the articles. In this degreasing, the trichloroethylene is repeatedly vaporized and condensed with constant recycle of the condensate. Often condensate is phase separated to remove water in the course of recycling.

Economic metal degreasing entails repeated use of the same solvent charge over an extended period, often for six months, by way of example, with addition of but small amounts of fresh trichloroethylene as compensation for operational losses. Greases, oil, dirt and fine metal particles thus accumulate in the liquid trichloroethylene. Under these conditions, trichloroethylene manifests a strong tendency to decompose with undue rapidity. In the degreasing of certain metals such as aluminum and aluminum alloys, this tendency is especially pronounced.

When decomposition occurs, serious problems arise. The trichloroethylene turns black and a thick, black viscous or solid residue develops which impairs and even halts continued use of the degreaser. Clogging occurs and tedious, difficult cleaning is necessitated before further operation of the degreaser. Decomposition thus has the double disadvantage of impairing use of the degreaser and interfering with the use of the trichloroethylene for an economically appropriate length of time. It is, accordingly, most important to stabilize properly trichloroethylene.

In accordance with this invention, it now has been discovered that certain aldehyde hydrazones may be used to stabilize effectively trichloroethylene. Thus, by including a small amount of certain aldehyde hydrazones in trichloroethylene, the tendency of the trichloroethylene to decompose may be retarded substantially and to an extent that permits the trichoroethylene to be employed effectively as a metal degreasing solvent. As a consequence of this invention, trichloroethylene containing a stabilizing concentration of an appropriate aldehyde hydrazone may even be employed for degreasing metals such as aluminum for extended periods without decomposing seriously and interfering with continued use of the degreaser.

Aldehyde hydrazones providing for the stabilization of trichloroethylene are the equimolecular condensation products of an aldehyde and a hydrazine. Usually these hydrazones are prepared by such condensation in a procedure as described in F. Klages, Annalen, volume 547, pages 1 to 38 (1941). The condensation of acetaldehyde and hydrazine, for example, to provide a contemplated stabilizing aldehyde hydrazone, may be broadly characterized as involving the reaction:

In general useful stabilizing aldehyde hydrazones are those provided by the condensation of an aldehyde having 1 to 3 carbon atoms, e.g., formaldehyde, acetaldehyde, propionaldehyde and acrolein, and hydrazine or a substituted hydrazine,

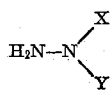

wherein X and Y are either hydrogen or aliphatic groups having 1 to 3 carbons, e.g., dimethylhydrazine, diethylhydrazine, methylhydrazine, ethylhydrazine, methylethylhydrazine, and propylmethylhydrazine. Best results are realized with aldehyde hydrazones having a total of 1 to 6 carbon atoms and no aliphatic group having more than 3 carbon atoms linked to the aldehyde hydrazone characterizing structure,

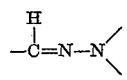

Acetaldehyde dimethylhydrazone and like aldehyde hydrazones soluble (in stabilizing concentrations) in trichloroethylene and having a normal boiling point close to the boiling point of trichloroethylene (within about 15° C.) are especially recommended for stabilizing trichloroethylene.

By formula, these aldehyde hydrazones are representable as:

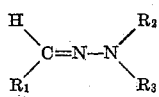

wherein $R_1$, $R_2$ and $R_3$ may be either hydrogen or an aliphatic group including saturated and unsaturated aliphatic groups, and notably an alkyl group of 1 to 3 carbons. The sum of the carbon atoms in groups represented by $R_1$, $R_2$ and $R_3$ preferably does not exceed 5. Thus, included are formaldehyde diethylhydrazone, formaldehyde dimethylhydrazone, formaldehyde methylethylhydrazone, acetaldehyde methylhydrazone, acetaldehyde methylethylhydrazone, formaldehyde propylhydrazone, formaldehyde isopropylhydrazone and propionaldehyde hydrazone.

The concentration of aldehyde hydrazone in trichloroethylene for purposes of stabilization may be varied with considerable latitude. A typical range is from 0.001 to 2.0 percent and preferably 0.01 to 0.5 percent hydrazone by weight of the trichloroethylene. Larger concentrations, although functional, are usually too costly and hence, not used.

For commercial purposes, it often is expeditious to protect trichloroethylene against any and all detrimental effects or decompositions. Thus, trichloroethylene besides containing an aldehyde hydrazone may contain other additives. Some such additives may even augment the stabilizing effect of the aldehyde hydrazone or retard other undesirable effects. Anti-oxidants and stabilizers regarded as useful for retarding decomposition catalyzed or prompted by photooxidation may be included along with the aldehyde hydrazone without detrimental effects.

One class of additives which may be used are aromatic compounds having a phenolic hydroxyl group linked directly to a ring carbon such as phenol, thymol, catechol, para-cresol, guaicol, methyl salicylate, eugenol, isoeugenol and like phenols having a normal boiling temperature on the order of 180° C. to 250° C.

Also, a wide variety of amines may be present along with the aldehyde hydrazone in the trichloroethylene. Amines in general have been recognized as imparting stabilizing qualities to trichloroethylene. Their use does not adversely effect the stabilizing action of the contemplated hydrazones. Among the typical amines are diethylamine, triethylamine, dipropylamine, tripropylamine, triisopropylamine, dibutylamine, di-sec-butylamine, di-isobutylamine, diisopropylamine, diethanolamine, morpholine, N-methylmorpholine, triethanolamine, beta-picoline, pyridene and aniline. Other nitrogenous additives which may be present include pyrroles such as methylpyrrole.

Organic epoxides (oxiranes) may also be used. Useful epoxides include ethylene oxide, 1,2-propylene oxide, 1,2-butylene oxide, 2,3-butylene oxide, butadiene monoxide, butadiene dioxide, epichlorohydrin, glycidol, isobutylene oxide, 1,2-octylene oxide, 2,3-octylene oxide, 2,3-diisobutylene oxide, styrene oxide, cyclohexene oxide and cyclopentene oxide. By oxiranes or epoxides compounds having an oxygen connected to adjacent carbons, e.g., having the group

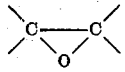

are intended.

Ethyl acetate or like esters of organic monocarboxylic acids, alcohols such as propynyl alcohol, methanol, ethanol and unsaturated compounds like pinene and diisobutylene also can be present in the trichloroethylene.

Generally, the concentration of all the additive present does not exceed 1 or 2 percent. The concentration of each additive individually is widely variable, but usually ranges from 0.001 to 0.5 percent by weight. Even then, some discretion is advisable.

The following example illustrates the stabilization of trichloroethylene in accordance with this invention:

*Example I*

Trichloroethylene was formulated to contain by weight 0.28 percent butylene oxides (about 30 percent 2,3-butylene oxide and about 70 percent 1,2-butylene oxide), 0.06 percent glycidol and 0.01 percent thymol. To a portion of this trichloroethylene 0.025 percent acetaldehyde dimethylhydrazone by weight was added. The initial pH and titer of these two portions were measured. The respective portions (with and without the hydrazone) were subjected to four distillations with a 10 percent by volume left and the recovered distillate tested for stability according to the Federal Accelerated Oxidation Procedure desecribed in Military Specification MIL-T-7003, September 5, 1950.

Such method determines the acid development and corrosive properties of trichloroethylene after 48 hours exposure to moisture, heat, light, oxygen and mild steel. It entails filling a 500 milliliter Erlenmeyer glass flask connected to a water cooled condenser with a 200 milliliter sample. A ½ inch by 2 inch by 1/16 inch steel strip is suspended by a copper wire through the flask above the liquid level in the flask. A second steel strip ¼ inch by ¾ inch by 1/16 inch is placed in the bottom of the flask. Oxygen saturated with water at about 25° C. is bubbled into the trichloroethylene during the test through a tube adjusted to within ¼ inch of the flask's bottom. With the water started in the condenser, a light bulb beneath the flask's bottom is switched on and oxygen admitted at the controlled rate of one bubble every 5 to 7 seconds. After 48 hours of refluxing (heat supplied by the light bulb), the contents of the flask are allowed to cool to room temperature.

A 25 milliliter sample is removed and its acidity-alkalinity determined by placing the sample in a 250 milliliter glass beaker containing 75 milliliters of neutral distilled water. The pH of the solution in the beaker is measured while stirring by a pH meter having a glass and a calomel electrode. Depending on the original pH, the sample is titrated with 0.01 N sodium hydroxide or 0.01 N hydrochloric acid until a neutral value is obtained, the milliliters required being reported as titer.

Following such test procedure with the trichloroethylene portions, these results were obtained:

|  | Initial | | After Test | |
|---|---|---|---|---|
|  | pH | Titer | pH | Titer |
| Without Acetaldehyde Dimethylhydrazone | 7.0 | 0.0 | 2.3 |  |
| With Acetaldehyde Dimethylhydrazone | 7.0 | 0.0 | 7.0 | 0.0 |

The sharp drop in pH and large increase in titer manifested in the portion of trichloroethylene not containing acetaldehyde dimethylhydrazone is indicative of ineffective stabilization. On the other hand, with acetaldehyde dimethylhydrazone, the pH remained fairly constant and there was no buildup of acidity indicative of highly effective stabilization. Essentially comparable test results are obtained using 0.01 and 0.05 percent acetaldehyde dimethylhydrazone.

While aldehyde hydrazones are admirably effective and especially unique in the stabilization of trichloroethylene for use in metal degreasing, other liquid halogenated hydrocarbons of 1 to 3 carbons are also beneficially stabilized. Thus, the hydrazones may be useful for stabilizing chlorinated aliphatic hydrocarbons include methyl chloride, ethylene chloride, perchloroethylene and 1,1,1-trichloropropane.

Although this invention has been described by reference to specific details of certain embodiments, it is not intended that the invention be construed as limited to such details except insofar as such details appear in the appended claims.

We claim:

1. A composition comprising a liquid halogenated aliphatic hydrocarbon containing a stabilizing concentration of an aliphatic aldehyde hydrazone, said aliphatic aldehyde hydrazone containing from 1 to 3 aliphatic groups, each of which groups contains from 1 to 3 carbon atoms.

2. A composition comprising a liquid chlorinated aliphatic hydrocarbon containing a stabilizing concentration of an aliphatic aldehyde hydrazone containing 1 to 6 carbon atoms, said aliphatic aldehyde hydrazone containing from 1 to 3 aliphatic groups, each of which groups contains from 1 to 3 carbon atoms.

3. A composition comprising trichloroethylene and a stabilizing concentration of an aliphatic aldehyde hydrazone having 1 to 6 carbons, said aliphatic aldehyde hydrazone containing from 1 to 3 aliphatic groups, each of which groups contains from 1 to 3 carbon atoms.

4. A composition comprising trichloroethylene and a stabilizing concentration of acetaldehyde dimethylhydrazone.

5. A stabilized trichloroethylene composition comprising trichloroethylene and a stabilizing concentration of acetaldehyde dimethylhydrazone, butylene oxide, glycidol and thymol.

6. A composition useful as a degreasing solvent comprising trichloroethylene and a stabilizing concentration of an aliphatic aldehyde dialkyl hydrazone having up to 6 carbon atoms, said aldehyde hydrazone containing alkyl groups which each contain from 1 to 3 carbon atoms.

7. A composition useful as a degreasing solvent comprising trichloroethylene and a stabilizing concentration of an aliphatic aldehyde hydrazone having up to 6 carbon atoms, said aliphatic aldehyde hydrazone containing from 1 to 3 aliphatic groups, each of which groups contains from 1 to 3 carbon atoms and an organic epoxide.

8. A composition useful as a degreasing solvent comprising trichloroethylene containing a stabilizing concentration of an aliphatic aldehyde hydrazone containing from 1 to 6 carbon atoms, said aliphatic aldehyde hydrazone containing from 1 to 3 aliphatic groups, each of which groups contains from 1 to 3 carbon atoms and a phenol having a normal boiling point of 180° C. to 250° C.

References Cited in the file of this patent
UNITED STATES PATENTS

| | | |
|---|---|---|
| 2,043,257 | Missbach | June 9, 1936 |
| 2,043,259 | Missbach | June 9, 1936 |
| 2,094,367 | Missbach | Sept. 28, 1937 |
| 2,371,645 | Aitchison et al. | Mar. 20, 1945 |
| 2,407,405 | Dietrich et al. | Sept. 10, 1946 |
| 2,786,044 | Warner et al. | Mar. 19, 1957 |
| 2,852,572 | Shukys et al. | Sept. 16, 1958 |